United States Patent
Malm et al.

(10) Patent No.: US 11,599,638 B2
(45) Date of Patent: Mar. 7, 2023

(54) GAME ENGINE-BASED COMPUTER SECURITY

(71) Applicant: JAMF Software, LLC, Minneapolis, MN (US)

(72) Inventors: Jonathan Allan Malm, Fulton, MD (US); Joshua Howard Stein, Palm City, FL (US); Patrick Nathaniel Wardle, Kula, HI (US)

(73) Assignee: JAMF Software, LLC, Minneapolis, MN (US)

( * ) Notice: Subject to any disclaimer, the term of this patent is extended or adjusted under 35 U.S.C. 154(b) by 811 days.

(21) Appl. No.: 16/533,710

(22) Filed: Aug. 6, 2019

(65) Prior Publication Data

US 2020/0050763 A1 Feb. 13, 2020

Related U.S. Application Data

(60) Provisional application No. 62/715,627, filed on Aug. 7, 2018.

(51) Int. Cl.
| | |
|---|---|
| *G06F 21/00* | (2013.01) |
| *G06F 21/56* | (2013.01) |
| *A63F 13/73* | (2014.01) |
| *G06F 21/52* | (2013.01) |

(52) U.S. Cl.
CPC ............ *G06F 21/565* (2013.01); *A63F 13/73* (2014.09); *G06F 21/52* (2013.01); *G06F 2221/034* (2013.01)

(58) Field of Classification Search
CPC ......... G06F 21/52; G06F 21/565; A63F 13/73
See application file for complete search history.

(56) References Cited

U.S. PATENT DOCUMENTS

| | | |
|---|---|---|
| 9,454,993 B1 | 9/2016 | Lawson et al. |
| 2004/0266533 A1 | 12/2004 | Gentles et al. |
| 2006/0154726 A1 | 7/2006 | Weston et al. |

(Continued)

OTHER PUBLICATIONS

Anonymous, "TheTrustedBSD Project", retrieved from <<http://www.trustedbsd.org/openbsm.html>>, first saved on May 24, 2005, 8 pages.

(Continued)

*Primary Examiner* — Jeffrey C Pwu
*Assistant Examiner* — Thong P Truong
(74) *Attorney, Agent, or Firm* — Benesch, Friedlander, Coplan & Aronoff LLP

(57) ABSTRACT

A game engine sensor of a computing device executing an operating system receives first data from the operating system that represents occurrence of a monitored event. The game engine sensor sends second data corresponding to the monitored event to a game engine logic controller. A first logic block of the game engine logic controller determines, based on the second data and third data representing a system state of the computing device, that a first predicate condition is satisfied. A second logic block of the game engine logic controller determines, based on the second data and the third data, that a second predicate condition is satisfied. A computer security threat is detected based on the first and second predicate conditions being satisfied, and at least one game engine actuator is instructed to perform at least one action responsive to the computer security threat.

18 Claims, 5 Drawing Sheets

(56) References Cited

U.S. PATENT DOCUMENTS

| | | |
|---|---|---|
| 2007/0243925 A1 | 10/2007 | LeMay et al. |
| 2008/0214300 A1 | 9/2008 | Williams et al. |
| 2011/0010697 A1* | 1/2011 | Golovkin ............ G06F 21/563 726/23 |
| 2012/0004039 A1 | 1/2012 | Perry et al. |
| 2016/0057020 A1 | 2/2016 | Halmstad et al. |
| 2016/0171827 A1 | 6/2016 | Washington et al. |
| 2017/0099592 A1 | 4/2017 | Loeb et al. |
| 2017/0235967 A1 | 8/2017 | Ray et al. |
| 2019/0081963 A1* | 3/2019 | Waghorn ............ G06F 21/552 |

OTHER PUBLICATIONS

Extended European Search Report dated Mar. 18, 2022 for European Application No. 19846733.4, 8 pages.
International Search Report and Written Opinion dated Oct. 28, 2019 for PCT Application No. PCT/US2019/045375, 7 pages.

* cited by examiner

GAME ENGINE-BASED COMPUTER SECURITY

CROSS-REFERENCE TO RELATED APPLICATION

This application claims priority to U.S. Provisional Patent Application No. 62/715,627 filed on Aug. 7, 2018, the entire content of which is hereby incorporated by reference in its entirety.

BACKGROUND

As computer systems and devices have become more popular, such systems and devices have become targets for malicious activity, such as viruses, malware, ransomware, phishing attacks, etc. Various computer security solutions are available to users and enterprises to try and prevent such malicious activity. Some computer security solutions are signature-based, and compare potentially malicious files or payloads to a signature that is known to correspond to malicious file(s). However, these solutions are only as good as the underlying signatures, and trying to issue signature updates to keep up with everchanging threats is a losing proposition, especially because sophisticated malware often has the ability to automatically mutate and defeat signature-based detection. Artificial intelligence (AI)-based solutions input a potentially malicious file (or data derived therefrom) into an AI model (e.g., a neural network) to predict whether or not the file is malicious. However, the effectiveness of an AI-based solution is determined by the underlying model, and it may sometimes be difficult to obtain sufficiently complete training data to train the model.

BRIEF DESCRIPTION OF THE DRAWINGS

For a fuller understanding of the nature and desired objects of the present disclosure, reference is made to the following detailed description taken in conjunction with the accompanying drawing figures wherein like reference characters denote corresponding parts throughout the several views.

DETAILED DESCRIPTION

Figure 1:
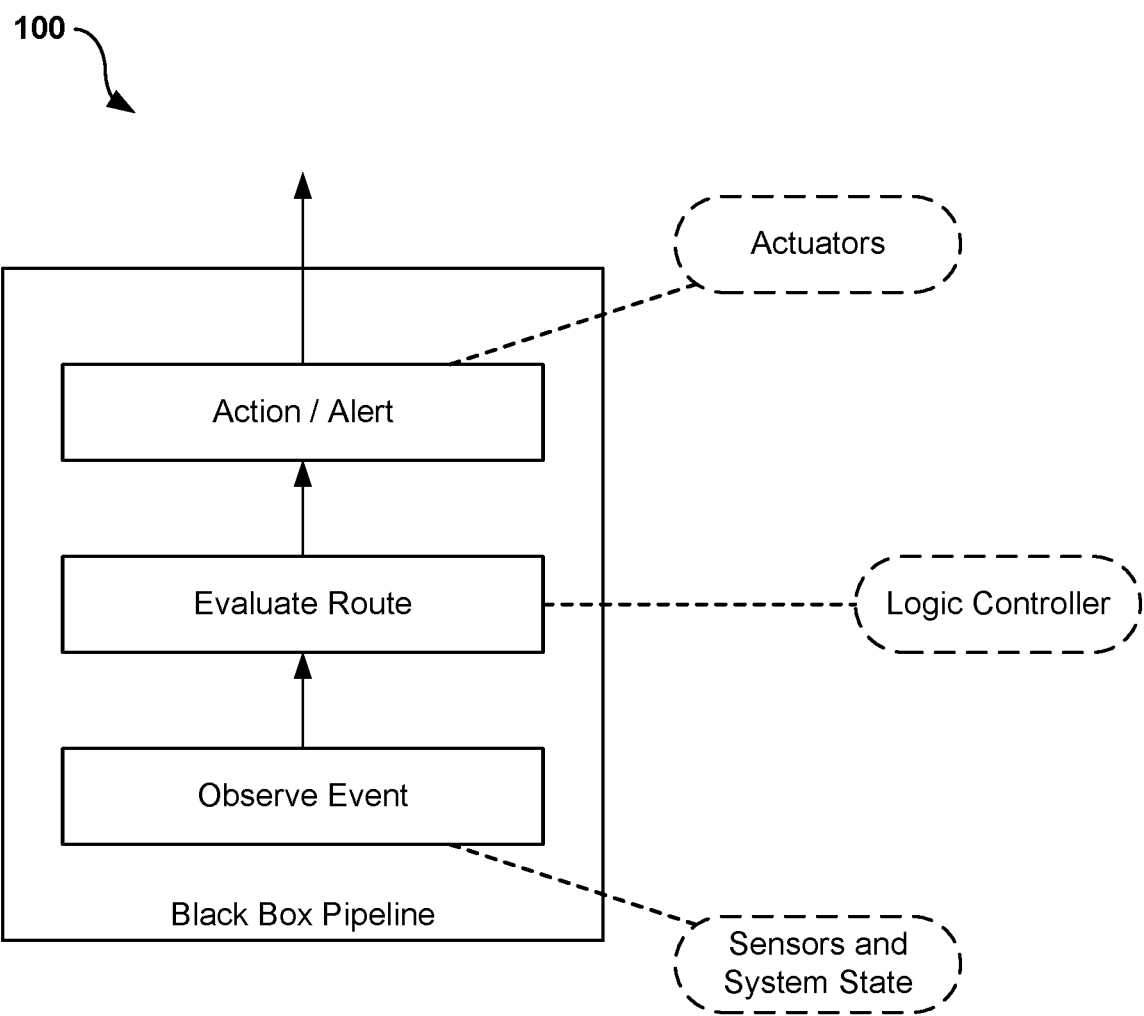
FIG. 1 illustrates an example of a "black box" computer security pipeline.

Aspects of the present disclosure may be understood with reference to the following definitions.

As used herein, the singular form "a," "an," and "the" include plural references unless the context clearly dictates otherwise.

Unless specifically stated or obvious from context, as used herein, the terms "about" and "substantially" are understood as within a range of normal tolerance in the art, for example within 2 standard deviations of the mean. "About" and "substantially" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the terms about or substantially.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

In certain aspects, a system and associated method for game engine-based computer security are disclosed. While game engines and computer security are considered to be unrelated computer concepts (and games are a common infection vector for malicious files), aspects of the present disclosure include leveraging components of game engine architectures to implement computer security functions, including functions that have nothing to do with any specific games or even gaming in general.

A game engine can include a software framework or development environment primarily designed for people to build reusable components of video games. Core functionality of a game engine often includes rendering engines, physics engines, animation, lighting effects, etc. Some game engines also include components configured to execute logical functions that determine a set of outputs that are to be performed within the game given one or more inputs generated or received within the game.

In a particular aspect, a game engine may include one or more sensors, a properties/state model, logic controller, and actuators. Sensors can gather data from a game environment and provide the data to the logic controller as properties and states of the objects in the environments. A properties/state model can represent inputs gathered from the sensor(s) and how such inputs fit into an overall model of the entire game environment. Logic controllers can execute operations and/or simulations over the game state and sensor properties, which can be used to adjust the game state and send signals to the actuators. Actuators can perform functions such as moving objects, adding/removing objects, etc. These actions may be initiated by the output of the logic controllers.

It will be appreciated that using a game engine to perform computer security functions is markedly different from conventional computer security techniques. For example, anti-virus and other endpoint detection techniques often rely on a rigid, black-boxed data pipeline of event observation, rule evaluation, and ultimately actions/alerts. An example of such a pipeline 100 is illustrated in FIG. 1. Mapping this pipelined process into gaming engine components (e.g., sensors, system state, logic controllers, and actuators) introduces a type of endpoint detection and response that is open, customizable, flexible, extensible, and supports artificial intelligence (AI)-based decisions. The methods and systems described herein enable modeling a computer operating system and end-user driven behaviors using game engine frameworks and semantics to collect, detect, and/or respond to interesting, suspicious, or malicious cyber security events on an endpoint device in a customizable, flexible, and extensible manner.

Figure 2:
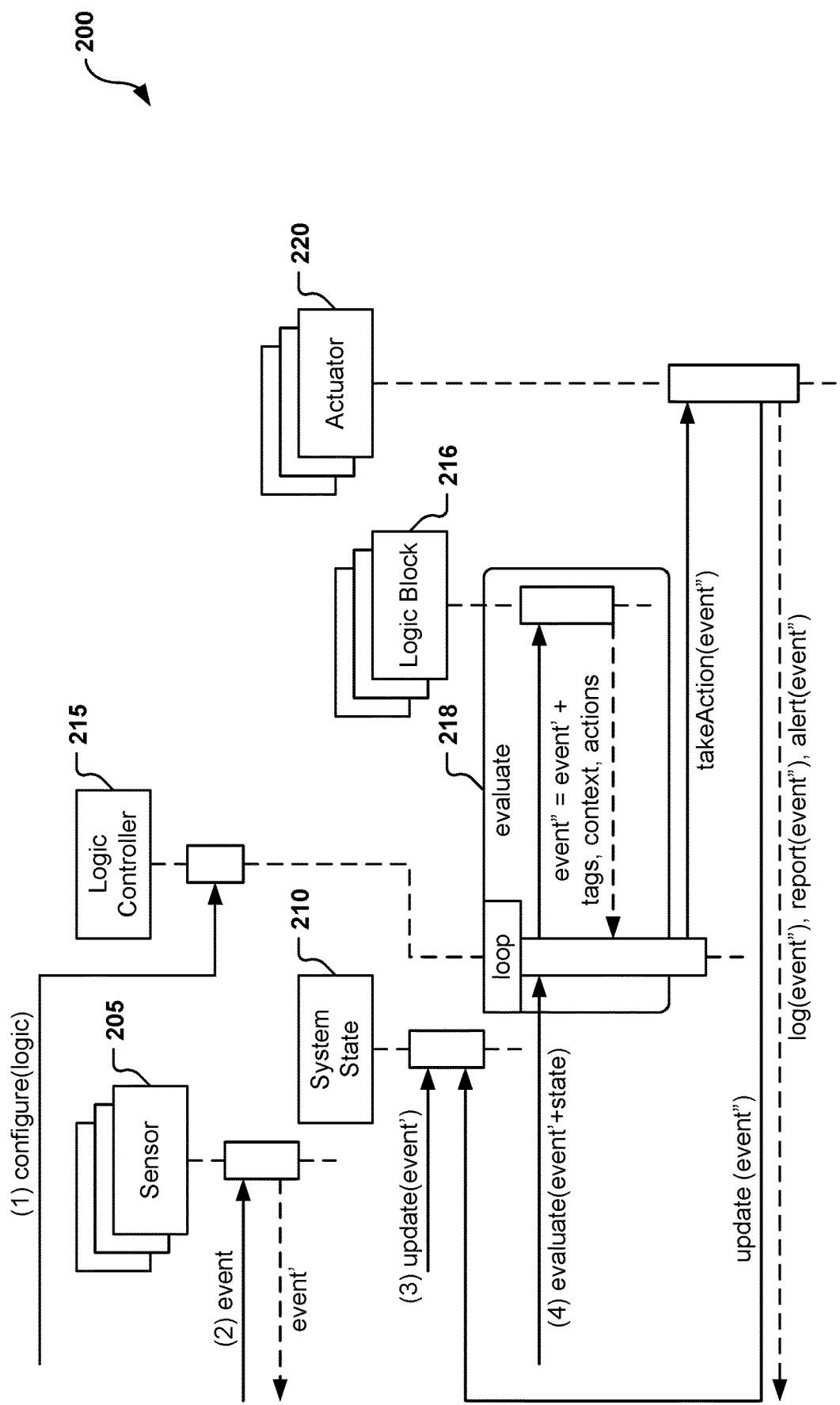
FIG. 2 illustrates an example of a system including game engine-based computer security.

FIG. 2 illustrates a system 200 that includes game engine-based computer security according to an aspect. The system 200 includes one or more sensors 205, which can be deployed with respect to an operating system as a series of monitors for real-time or near-real-time detection of operating system events (e.g., system event monitors). To illustrate, the sensors 205 may correspond to software subroutines that utilize user-mode and/or kernel-mode communication with the operating system or components that are generally under control of the operating system. In some examples, the sensors 205 may additionally or alternatively correspond to hardware components that are in communication with the operating system.

In particular examples, the sensors 205 are based on an operating system audit framework or application programming interface (API), such as OpenBSM, that supports monitoring of processes, files, input/output (I/O) operations, network activity, downloads, keyloggers, synthetic clicks, peripheral access (e.g., camera or microphone), screenshots, etc. Thus, the sensors 205 can include, but are not limited to: a file system monitor, a process monitor, a network monitor, an authentication monitor (e.g., a keychain monitor), a download monitor, a screenshot monitor, a removable media (e.g., USB, external hard drive, etc.) monitor, a synthetic click (e.g., a programmatic use of the mouse) monitor, a volume (e.g., logical disk) monitor, a user activity resumption monitor (e.g., opening laptop lid, returning from a screensaver mode, powering on, etc.), and/or webcam/microphone activity monitors.

The sensors 205 can observe, parse, and organize raw data into a target data model, facilitating an update to system state (e.g., cache) to reflect a newly received event and to enable sending the new event and system state to a logic controller. An illustrative non-limiting example of raw data that may be received by a sensor 205 from an operating system when a calculator app is launched is provided below:

posix_spawn(2)/43190/2019-08-05    23:54:10+0000/7 tokens

Token AUT_HEADER32:
size :219
version :11
e_type :43190
e_mod :0
s :1565049250
ms :761
Token AUT_EXEC_ARGS:
arg :/Applications/Calculator.app/Contents/MacOS/Calculator
Token AUT_PATH:
path :/dev/null
Token AUT_DATA:
Token AUT_SUBJECT32:
auid :4294967295
euid :501
egid :20
ruid :501
rgid :20
pid :48653
sid :100000
tid :au_tid32(port: 0, addr: 0)
Token AUT_RETURN32:
status :0
ret :0
Token AUT_TRAILER:
magic :45317
count :219

An illustrative non-limiting example of a target data model is provided below. The example includes a "Process Event" object, which includes a "Process" sub-object. It is to be understood that any number of objects may be part of the target data model, and objects may include any number of sub-objects. Moreover, the target data model can not only include some of the raw data received from the operating system, but can also include data that is calculated based on the raw data and/or based on other data that is available or can be measured. In some cases, the target data model includes or points to code that is executable to calculate certain data items, and such data items are evaluated dynamically (e.g., just-in-time) when they are referenced by a logic block/rule.

```
{"label": "Process Event", "value": "$event", "type": "GPProcessEvent",
    "description": "Process create and exit events.", "icon": "process",
    "fields": [
        {"label": "Unique ID", "value": "uuid", "type": "string", "coding":
            "base", "description": "A unique identifier for this
            event."},
        {"label": "type", "value": "type", "type": "enum", "coding":
            "base", "description": "Process activity.",
            "options": [
                {"label": "None", "value": 0},
                {"label": "Create", "value": 1},
                {"label": "Exit", "value": 2}
            ]
        },
        {"label": "subtype", "value": "subType", "type": "enum",
            "coding": "base", "description": "Detailed process
            activity.",
            "options": [
                {"label": "Exec", "value": 7},
                {"label": "Fork", "value": 2},
                {"label": "Exit", "value": 1},
                {"label": "Execve", "value": 23},
                {"label": "Posix Spawn", "value": 43190}
            ]
        },
        {"label": "Timestamp", "value": "timestamp", "coding": "base",
            "type": "date", "description": "The timestamp of the
            process event."},
```

```
            {"label": "Process ID", "value": "pid", "type": "number",
                "coding": "base", "description": "The process identifier
                associated with the process event."},
            {"label": "Process", "value": "process", "type": "process",
                "coding": "related", "description": "Process object
                associated with this event."}
        ]
    }
    {"label": "Process", "value": "process", "type": "process", "description": "An
        object representing a process and its attributes.",
        "fields": [
            {"label": "Unique ID", "value": "uuid", "type": "string", "coding":
                "base", "description": "A unique identifier for this
                process."},
            {"label": "Process ID", "value": "pid", "type": "number",
                "coding": "base", "description": "The process identifier
                associated with this process."},
            {"label": "User ID", "value": "uid", "type": "number", "coding":
                "base", "description": "The identifier assigned to the user
                responsible for executing this process."},
            {"label": "Group ID", "value": "gid", "type": "number", "coding":
                "base", "description": "The identifier assigned to the
                group responsible for executing this process."},
            {"label": "Real User ID", "value": "ruid", "type": "number",
                "coding": "base", "description": "The identifier assigned
                to the real user responsible for executing this process."},
            {"label": "Real Group ID", "value": "rgid", "type": "number",
                "coding": "base", "description": "The identifier assigned
                to the real group responsible for executing this process."},
            {"label": "Process Group ID", "value": "pgid", "type": "number",
                "coding": "base", "description": "The process group
                associated with this process."},
            {"label": "Start Timestamp", "value": "startTimestamp", "type":
                "date", "coding": "base", "description": "The starting
                timestamp of the process."},
            {"label": "End Timestamp", "value": "endTimestamp", "type":
                "date", "coding": "base", "description": "The ending
                timestamp of the process."},
            {"label": "Path", "value": "path", "type": "string", "coding":
                "base", "description": "The binary path of the
                processes."},
            {"label": "Name", "value": "name", "type": "string", "coding":
                "base", "description": "The name of the processes."},
            {"label": "Parent Process ID", "value": "ppid", "type": "number",
                "coding": "base", "description": "The process identifier of
                the parent process."},
            {"label": "Args", "value": "args", "type": "array", "coding":
                "extended", "description": "A list of arguments
                (optionally) passed to the process."},
            {"label": "Exit Code", "value": "exitCode", "type": "number",
                "coding": "base", "description": "The exit code for the
                process."},
            {"label": "Binary", "value": "binary", "type": "binary", "coding":
                "related", "description": "The system binary associated
                with the process."},
            {"label": "User", "value": "user", "type": "user", "coding":
                "related", "description": "User that started/owns the
                process."},
            {"label": "Group", "value": "group", "type": "group", "coding":
                "related", "description": "Group that started/owns the
                process."},
            {"label": "Parent", "value": "parent", "type": "process", "coding":
                "related", "description": "The process object responsible
                for spawning this process."},
            {"label": "Is GUI App", "value": "guiAPP", "type": "bool",
                "coding": "extended", "description": "True is this process
                is an app with a graphical user interface (GUI)."},
            {"label": "Signing Information", "value": "signingInfo", "type":
                "signing", "coding": "extended", "description": "The
                dynamic code signing information associated with this process."},
            {"label": "Icon", "value": "icon", "type": "image", "description":
                "The image icon for the process."},
            {"label": "Bundle", "value": "bundle", "type": "bundle",
                "description": "The bundle associated with this process."},
            {"label": "App Path", "value": "appPath", "type": "string",
```

"coding": "extended", "description": "The full path to the application associated with this process."}
]
}

The system 200 can also include a system state model 210. The model 210 (designated "system state" in FIG. 2) can receive raw data from an operating system (e.g., observed by the sensors 205). In some examples, all or a portion of the parsing and organizing described above as being performed by the sensors 205 may instead be performed at the model 210. The modeled event data received from the sensors 205 and/or generated at the model 210 can be further extended to include calculations (e.g., predetermined calculation) and relationships (e.g., known relationships), including data calculated/gathered in code. Aspects of the system 200 can be modeled through a cache of prior-evaluated events (e.g., extended with previous logic controller outputs/extensions) and previously collected system data types (e.g., files, processes, users, groups, etc.) representing the current and historical state of the environment. In some examples, the system state cache is a table or other data structure in which previous events are stored and can be queried. Thus, at a given point in time, the model 210 may represent what is "currently" happening at the system 200 and/or what has happened in the system 200 up to that point in time.

In some aspects, the model 210 enables extensions (e.g. "tags") to be applied by customized, user-defined logic evaluated in a logic controller, as further described herein. Such extensions can be used to describe higher level concepts and behaviors as they are chained together during event evaluation in a logic controller, enabling an event to be more well-understood as the event makes its way through the system 200. In some cases, the event can be re-evaluated as "orthogonal data" with respect to a later event.

The system 200 can also include a logic controller 215. The logic controller 215 can be or implement a predicate-based rule system, graph, decision tree, state machine, deterministic or probabilistic strategies, custom code, and/or other artificial intelligence (AI) algorithms, including AI-discoverable logic blocks within the aforementioned systems. The logic controller 215 may be built on logic blocks 216 that can be individually defined, configured, added, removed, etc., to describe and/or detect different behaviors. The logic blocks 216 can be chained together to describe higher level concepts and detect "emergent" behaviors, as the output from a single logic block 216 can be fed into other logic block(s) 216 as an input. The logic controller 215 can receive new (e.g., modeled) input from the sensors 205. The logic controller 215 may then execute the logic blocks 216 in a configured order. Encapsulating logic for different computer security detectors in different logic blocks 216 enables rapid deployment of detectors for various security threats. To illustrate, the same predefined or user-defined logic block can be deployed in different threat detectors.

The execution of the logic blocks 216 can result in a variety of functions. In some cases, the execution of the logic blocks 216 can update or extend the system state model 210 for an individual event. The logic blocks 216 can build upon qualitative and quantitative data associated with system events. The system 200 can support "context" data (e.g., key:value pairs) and/or "tags" data (e.g., a list of keys). Both types of data can be used as inputs to rules.

In some cases, the execution of the logic blocks 216 can result in outputting a fully-enriched event so that the system state model 210 for the system 200 can be updated, including any calculated "context" and/or "tags." In some cases, the execution of the logic blocks 216 can result in outputting a list of "actions" that feed actuators, as further described herein.

It will be appreciated that the ability to chain different combinations of logic blocks 216 enables a powerful and flexible detection framework for computer security issues. Upstream logic blocks 216 can be thought of as "labelers" that selectively tag events and other data as it travels through the system 200, and downstream logic blocks 216 can be thought of as predicate "combiners" that issue commands to the actuators 220 to take certain actions if a specific combination of event tags and/or system state exists. As an example of logic block (or rule) chaining, a first logic block may detect whether a file is unsigned, and a second logic block may initiate an alert if a file that was detected as unsigned elevates (or attempts to elevate) guest account privileges.

The system 200 can include a set of actuators 220. The actuators 220 can receive input from the logic controller 215 (where that input was determined based on event(s) detected by the sensors 205 and/or information from the model 210 regarding overall system state) and perform one or more actions based on the received input. Actuator actions can be configurable (e.g., configured destination(s) for logs, alerts, etc.). Thus, depending on configuration, the same actuator may cause more or less data to be cached at the system state model 210, written to a log file, etc., thus enabling an administrator to set a verbosity of data returned. For example, an administrator can select the amount and/or types of orthogonal data cached, logged, collected, etc.

The actuators 220 can execute a variety of actions. In some cases, the actuators 220 can perform a "cache" action, where the actuators 220 update a system-wide state (e.g., the model 210) with output of the logic controller 215 for a given event. In some cases, the actuators 220 can perform a "local/remote logging" action, where the actuators 220 write the outputs of the logic controller 215 to either a log entry of a local log file or a remote logging capability (e.g., an event and log manager, etc.). In some cases, the actuators 220 can perform an "active response" action, where the actuators 220 can, for example, alert the system or a user of a security threat, quarantine files, delete files, gather additional data, terminate a process, adjust a system firewall, and/or terminate a network connection, etc.

Depending on implementation, one or more components of FIG. 2 may be included as part of a game engine. For example, the system state model 210, the logic controller 215, the logic blocks 216, and the actuators 220 may be part of a game engine, whereas the sensors 205 may be coupled to the game engine.

During operation, the system 200 may implement various computer security procedures. To illustrate, a logic controller 215 may be configured to perform certain operations (designated "(1)" in FIG. 2). The sensors 205 may receive an event (designated "(2)"), for example an event generated by or occurring at an operating system of a computing device. The sensors 205 may manipulate the raw data of the event to generate event' (a representation of the event that is compatible with the system state model 210). The model 210 may be updated based on the event' (designated "(3)"). A combination of the event' and system state from the model 210 may be provided to one or more logic blocks 216 that implement (e.g., are invoked by) the logic controller 215. For example, an iterative code loop 218 may evaluate (designated "(4)") the modeled event' and system state from the model 210, which includes identifying applicable tags/contexts/actions, to generate event". If the logic controller 215 determines that an action is to be taken, the logic controller 215 instructs an actuator 220 to take the action, such as logging, reporting, and/or communicating an alert. In some examples, the system state model 210 may be further updated based on event" and the taken action(s).

The logic blocks 216 may thus represent predicates that can be chained together. In some examples, predicates can be defined for initial access, execution, persistence, privilege escalation, defense evasion, credential access, discovery, lateral movement, collection, exfiltration, command & control, etc. Such predicates may be reused in various logic controllers that are configured to detect various security issues based on streaming events from an operating system and/or cached event data from a system state model.

It will be appreciated that the game engine-based security techniques described herein may look beyond conventional signatures and file/content-based detection to specifically find suspicious behaviors. Malware/suspicious activity typically begins as unknown. Conventional signature and file/content-based detections expect something to be known (or at least fundamentally different at the file/binary/content level). Malware/suspicious activity typically has an objective that it eventually attempts to complete. Therefore, instead of looking for a known "bad" at the file/binary/content level (which nevertheless can be incorporated in some implementations of the described game engine-based security system), the described techniques involve inspecting and identifying suspicious behaviors at the activity level, and many such behaviors are missed by conventional signature and file/content-based detection systems. While it may be true that at least some something has to start acting suspiciously before it is found behaviorally, conventional signature and file/content-based systems are typically unable to detect this activity, and rely upon some a priori knowledge of an actual sample. If the sample is unknown (e.g., in the case of a 0-day threat), irreversible malicious activity can occur and the threat can remain unknown. However, in the described game engine-based security system, the threat will at least become identified due to its activity and can be responded to accordingly, even in cases where the malicious activity was not fully prevented at the first infected device. In some examples, when suspicious activity is detected, the file/process corresponding to the suspicious activity is "sandboxed" or moved to a virtual machine and allowed to complete malicious activity in relatively harmless fashion while being monitored closely, so that additional knowledge about the threat can be gained.

Figure 3:
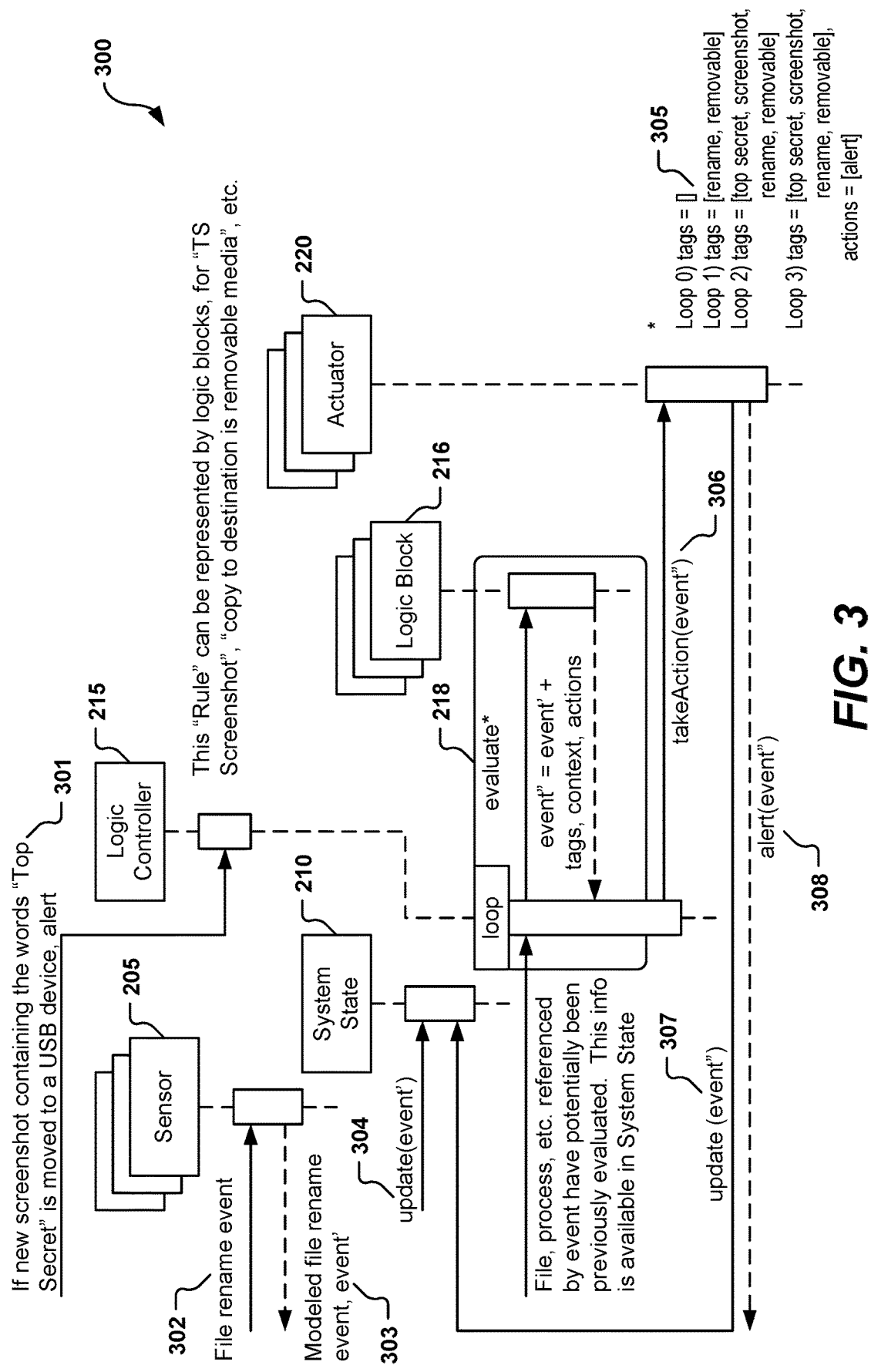
FIG. 3 illustrates an example of operation at the system of FIG. 2 with respect to a particular computer security use case.

FIG. 3 illustrates an example of operation at the system 200 and is generally designated 300. FIG. 3 represents the use case of detecting when a screenshot image containing the words "Top Secret" is copied or moved from the system 200 to a removable media device, and to further alert a network or administrator of the copy/move. Configuration (for a logic controller) corresponding to this use case is designated 301. Configuring the logic controller may include creating and/or chaining logic blocks corresponding to different predicate rules, as further described herein.

The sensors 205 (e.g., a file system sensor) can observe a raw file system event 302 generated by the operating system. The sensors 205 can further parse and organize the raw file system event into a modeled event 303. For example, semi-documented data provided by the operating system can include path data, such as "/Users/user1/Desktop/example.png," and type data, such as "File Rename," etc. The organized data can then be input into the system state model 210 as an update 304. Additionally, "extended" data can be input into the system state model 210 as well. Examples of extended data can include additional data for the file found at the referenced file path. In some cases, extended data can also include orthogonal data queried from the operating system.

The system state model 210 can be further extended by data that is extracted from the file associated with the event. For example, different types of extracted data can include raw data, optical character recognition (OCR) data, file attributes, etc.

The following is an example of a composite rule to generate an alert when a screenshot with the term "Top Secret" is moved to removable media:
  InputType: File System Event
  OutputTags: Screenshot, Top Secret, Rename, Removable
  Predicate: event.type==RENAME AND
    event.destpath.isRemovable==true AND
    event.destpath.file.isScreenshot==true AND
    event.destpath.file.asOCRImage.contains("Top Secret").
  Action: Alert Thus, the composite rule can include a comprehensive "one-shot" evaluation of the predicate, resulting in executing an "alert" action.

Alternatively, a chain of logic blocks of the logic controller 215, rather than a single composite rule, can leverage the system state model 210. The use of discrete chainable logic blocks can enable the reuse of components for resource-expensive operations (e.g., OCR image recognition). An example logic block to detect copying or moving a file to removable media is provided below:
  Rule Def:
    InputType: File System Event
    Tags: Rename, Removable
    Predicate: event.type==RENAME AND
      event.destpath.isRemovable==true.

The event type "RENAME" is used above because the operating system in question generates a RENAME event when a file is copied or moved. Thus, when a file is copied or moved to a removable disk, the observed event can be tagged with the tags "Rename" and "Removable." The system state model 210 can be updated with this tag, and the event can continue through the rest of the system state model rule system with the tag applied.

In another example, a rule can be generated for monitoring and executing actions on events associated with specific language, such as "Top Secret." An example logic block to determine if OCR data from a screenshot includes "Top Secret" is provided below:
  Rule Def:
    InputType: File System Event
    Tags: Top Secret, Screenshot
    Predicate: event.file.isScreenshot==true AND event.file.asOCRImage contains "Top Secret"

Thus, when any screenshot file with characters recognized as "Top Secret" (which may or may not be case sensitive) is observed, the system state model 210 can be updated with tags of "Top Secret" and "Screenshot." The event can then continue through the rest of the system state model rule system with the tags applied.

In yet another example, a rule can be generated for providing an alert based on the monitored events. An example logic block to output an alert when both the removable media rule and the "Top Secret" OCR data rule are triggered is provided below:

Alert:
    InputType: File System Event
    Actions: Alert
    Tags: Suspicious
    Predicate: ("Top Secret", "Screenshot", "Rename" and "Removable") in $tags.

When an event "reaches" this rule, and has been tagged with appropriate tags ("Top Secret," "Screenshot," "Rename," and "Removable") the system state model 210 can be updated with the "Suspicious" tag, and the event will continue through the rest of the rule scheme with this tag applied. The system state model 210 can also be updated to include an "Alert" action associated with the event, so that when the event completes its run through the rule scheme, the system 200 can execute an alert action based on this rule. As shown at 305, it may take more than one logic block execution "loop" before all of the tags are attached and an action is determined.

Additionally, or alternatively, a rule can include a salience value, which can position the execution of the rule within the order of an overall rule scheme. To illustrate, a salience value of two may indicate that an alert is to be run subsequent to other rules in the rule scheme. Additionally, or alternatively, when a rule evaluates as true, one or more confidence values may be assigned to the evaluation. In an illustrative example, a confidence value is a number between zero and one, and the use of confidence values makes combining rule outputs "fuzzy" in nature. When a rule applies multiple tags to an event, the tags may share a common confidence value or each tag may have its own confidence value. In some aspects, when confidence values are used, a security threat may be detected based at least in part on an aggregate (e.g., mean, sum, or other function) of the confidence values satisfying a threshold. In some cases, when confidence values are used, "final" rules that combine various tags to detect suspicious activity can be replaced with a rule that compares an aggregate confidence to a threshold.

In the illustrated example, when it is determined that a screenshot including the term "Top Secret" is being copied to removable media, actuator(s) are instructed 306 to take action(s), such as updating 307 the system state model 210 and outputting an alert 308 (which may be visual, audible, a communication message (e.g., text, email, etc.), or another type of alert).

The example of FIG. 3 thus illustrates an example of the flexibility and robustness of modeling and implementing computer security operations using game engine components such as input sensors, modeled events, system state caches, logic controllers/blocks, and actuators. With each executed rule, a system state model may be extended with additional knowledge that can be referenced or used in future rule (or logic block) evaluation, including information regarding actuated commands/actions that may be performed. By utilizing both real-time or near-real-time event streams as well as cached system state, the disclosed game engine-based computer security systems and methods are able to detect security issues, including previously unknown security issues, that may evade signature-based and AI-based solutions. Moreover, by having tags travel with the events as the events make their way through the system, and by caching previous events along with their tag information in a system state cache, the described techniques can examine events in the aggregate and detect security threats even if those events seemed innocent when examined individually. The described techniques may thus be able to thwart security threats that self-modify to avoid signature-based detection and "slow-play" their malicious activity to avoid traditional behavior-based/heuristic detection. In some implementations, the disclosed game engine-based computer security techniques may be used in conjunction with another (e.g., signature-based) security system.

In an example, the disclosed game engine-based computer security techniques may be configured to detect ransomware-like threats. In ransomware-like threats, there are usually three conditions that are satisfied: modification of files in specific directories by a process that is not signed by a trusted entity (e.g., the operating system vendor) or trusted software marketplace (e.g., a known app store), file contents being encrypted, and the same process encrypting a large number of files in a short time period. Thus, a first logic block may be defined to determine if a file modification is an encryption operation by an untrusted process in a user directory, and, if so, may tag the event with a label "UntrustedEncrypt":

$event.isModified==true AND
    $event.path MATCHES [user directory] AND
    !$event.process.labels.contains ([operating system signer],
    [app store signer]) AND
    $event.contents.encrypted==true In some cases, the operating system is able provide input to the sensors 205 about whether a file is encrypted. In other cases, an encryption detector may be used, where the encryption detector differentiates between encrypted, unencrypted, and compressed files based on a combination of mathematical techniques, such as entropy analysis, chi square distribution, monte carlo pi analysis, etc.

A second logic block may be chained to the first logic block and may be defined to determine whether, when the UntrustedEncrypt label is present, the process responsible for that untrusted encryption of a file has quickly encrypted multiple files:

$event.labels.contains("UntrustedEncrypt") AND
    [system state indicates>X files encrypted in the past Y seconds by that process]

It will be appreciated that in the above example, the "labels" data structure for the event is used to maintain events tags for the event as the event makes its way through the game engine-based security system. If the predicate embodied by the second logic block evaluates as true, then a ransomware-like threat has been detected, and particular actuators can be activated to take appropriate actions.

In another example, the disclosed game engine-based computer security techniques may be configured to detect advanced persistent threat (APT) behavior. One example of an APT threat is Windshift, a macOS® threat that infects systems by using a combination of web browsers automatically opening downloaded files, registering a custom URL handler, and launching an application. macOS® is a registered trademark of Apple Computer, Inc. of Cupertino, Calif. To detect a Windshift like threat, a first rule may be used to detect an automatic opening of a file by a web browser:

$event.isNewDirectory==true AND
    $event.process.name==[browser name]

A second rule may be used to detect a custom URL handler:

$event.isNewDirectory==true AND
$event.file.isAppBundle==true AND
$event.file.bundle.infoDictionary.CFBundleURLTypes !=nil Although certain examples may be described herein with respect to macOS® security, it is to be understood that this is for illustration only and not to be considered limiting.

A third rule may be used to detect an application launch. If all three rules have tagged the event(s), then an actuator may be instructed to take appropriate action (e.g., trigger an alert that a possible Windshift-like threat has been detected).

As another example, the disclosed game engine-based computer security techniques may be configured to detect malware such as or similar to FruitFly, a Mac malware that went undetected for nearly fifteen years. FruitFly exhibited a specific set of install time behaviors that can be detected using the rules/logic chaining of the present disclosure. In particular, FruitFly installed itself in a location that would enable it to persist between reboot cycles, FruitFly was not signed by the operating system vendor, and FruitFly would utilize a hidden binary. A first rule may be used to detect launch item persistence:

$event.path MATCHES [persistent launch agents file path(s)] AND
$event.isNewFile==true A second rule may be used to determine if a file is not signed by the operating system vendor:

!$event.file.contentsAsDict.ProgramArguments[0].signingInfo([OS signer])

A third rule may be used to determine if a hidden binary is utilized (in the below example, a hidden macOS® file is detected based on the telltale property of its filename starting with a period):

"LaunchD" IN $tags AND
$event.file.contentsAsDict.ProgramArguments [0].lastPathComponent.startsWith (".")

During runtime, FruitFly executed the hidden binary as an unsigned process and dropped a payload in a commonly used folder for temporary files, exemplary rules for which are provided below. FruitFly would also often access a computer's camera and generate synthetic clicks, both of which may similarly be detected using the sensor framework and rule chaining of the present disclosure.

$event.process.path.lastPathComponent.startsWith(".")
$event.process.path.startsWith([filepath for temporary folder])
$event.process.labels.contains("Unsigned")

In another example, the disclosed game engine-based computer security techniques may be configured to detect if a normally trusted individual (e.g., company employee) is behaving in a manner that may threaten security of the company. For example, a rule may be used to detect whether a user is writing files to removable drive (which may be a violation of company policy):

$event.isNew==true AND
$event.file.onRemoveableMedia==true AND
$event.path MATCHES [drives/volumes path]

As another example, a rule may be used to detect when a user attempts to run a program with modified security privileges by invoking the sudo utility:

$event.path "/usr/bin/sudo"

Additional rules may be used to detect when an employee takes screen captures or is performing any activity after normal working hours.

In another example, a rule may be configured to detect if a file attempts to delete itself, which can be a sign that the file may be malicious.

$event.type==file.delete AND $event.process.path==$event.path

A combination of the self-deletion rule and a rule configured to detect a change to domain name system (DNS) settings of network interface(s) may be used to detect malware threats such as MaMi, a macOS® DNS hijacking malware.

As yet another example, a rule may be used to detect if an attempt was made to write a payload into a system integrity protected (SIP) operating system location.

It is to be noted that the various examples and use cases described herein are merely illustrative and are not to be considered limiting. The techniques of the present disclosure may be used with various types of computing devices, including but not limited to desktops, laptops, servers, tablets, mobile phones, portable media players, wearable computing devices, etc. The described techniques may be used for various operating systems, including but not limited to macOS®, Windows®, Linux®, mobile/embedded operating systems (e.g., iOS® or Android®), etc. Windows is a registered trademark of Microsoft Corp. of Redmond, Wash. Linux is a registered trademark of Linus Torvalds or Boston, Mass. iOS is a registered trademark of Cisco Technology, Inc. of San Jose, Calif. Android is a registered trademark of Google Inc. of Mountain View, Calif.

Figure 4:
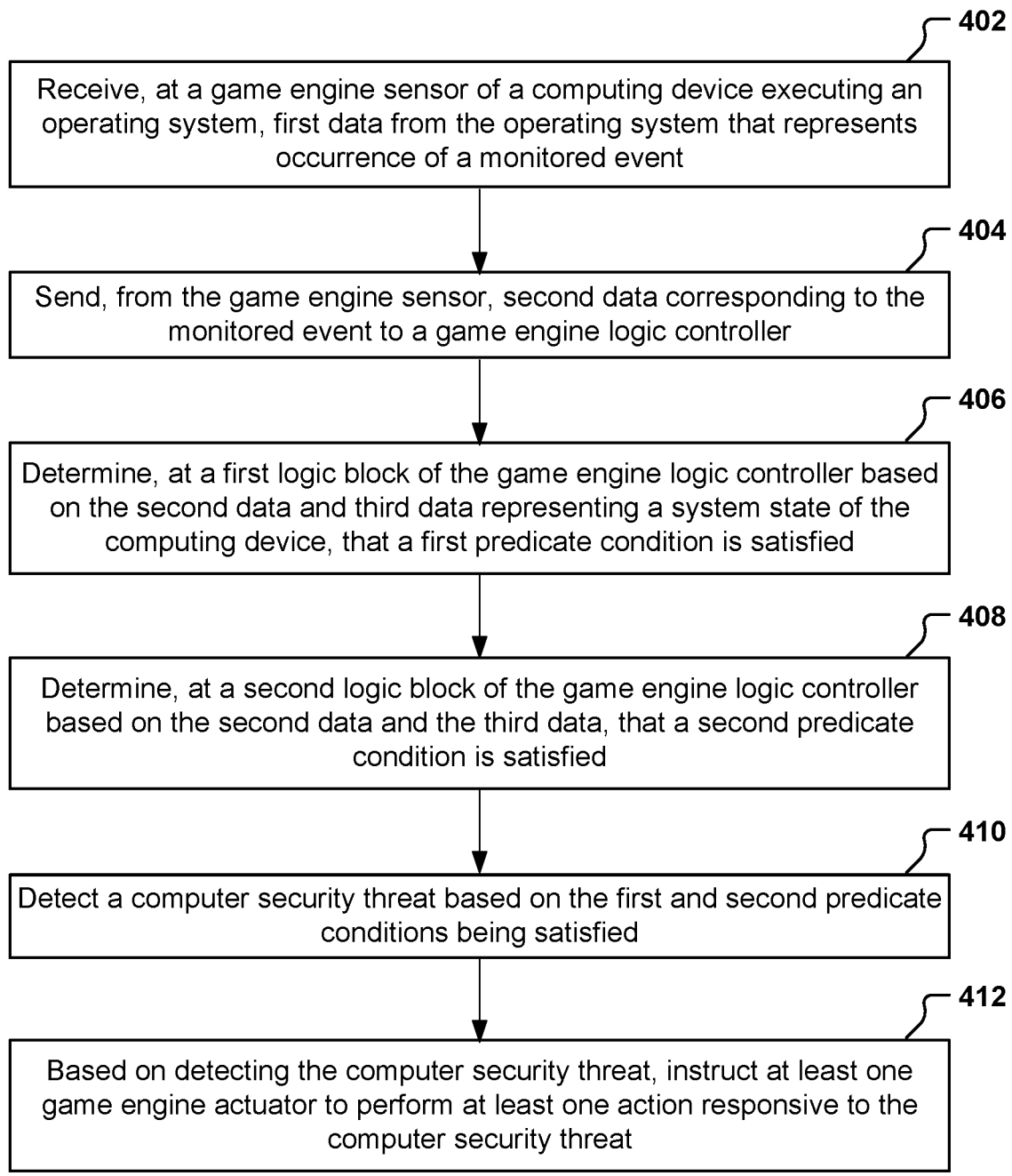
FIG. 4 illustrates an example of a method of game engine-based computer security.

FIG. 4. illustrates a particular example of a method 400 of game engine-based computer security. In illustrative examples, the method 400 corresponds to operations described with reference to FIGS. 2-3.

The method 400 includes receiving, at a game engine sensor of a computing device executing an operating system, first data from the operating system that represents occurrence of a monitored event, at 402. For example, the sensor 205 may receive data from an operating system, where that data represents occurrence of a monitored event. The method 400 also includes sending, from the game engine sensor, second data corresponding to the monitored event to a game engine logic controller, at 404. For example, the sensor 205 may send modeled event data to the logic controller 215.

The method 400 further includes determining, at a first logic block of the game engine logic controller based on the second data and third data representing a system state of the computing device, that a first predicate condition is satisfied, at 406. The method 400 includes determining, at a second logic block of the game engine logic controller based on the second data and the third data, that a second predicate condition is satisfied, at 408. For example, different logic blocks 216 may determine that various predicate conditions are satisfied, as described with reference to FIGS. 2-3.

The method 400 also includes detecting a computer security threat based on the first and second predicate conditions being satisfied, at 410. The method 400 further includes, based on detecting the computer security threat, instructing at least one game engine actuator to perform at least one action responsive to the computer security threat, at 412. For example, the actuator 220 may be instructed to perform an action responsive to the detected threat. Such actions an include updating the system state model 210, generating an alert, quarantining a file, terminating a process, etc.

In particular aspects, the game engine-based computer security techniques of the present disclosure may be applied in a mobile device management (MDM) context. In MDM systems, a MDM server may maintain group membership information based on "smart" groups. As used herein, a "smart" group may be a group whose membership is dynamically updated in response to certain events. To illustrate, an information technology (IT) administrator may create a group that is directed to a particular set of users (e.g., a particular age group, a particular employment role, etc.). The membership of the group may be dynamically updated as managed devices (e.g., mobile phones, tablet computers, laptop computers, televisions, smart devices, entertainment devices, appliances, vehicles, navigation devices, etc.) send join group requests or reset requests to the MDM server. As used herein, a "MDM group" refers to a smart group.

Figure 5:
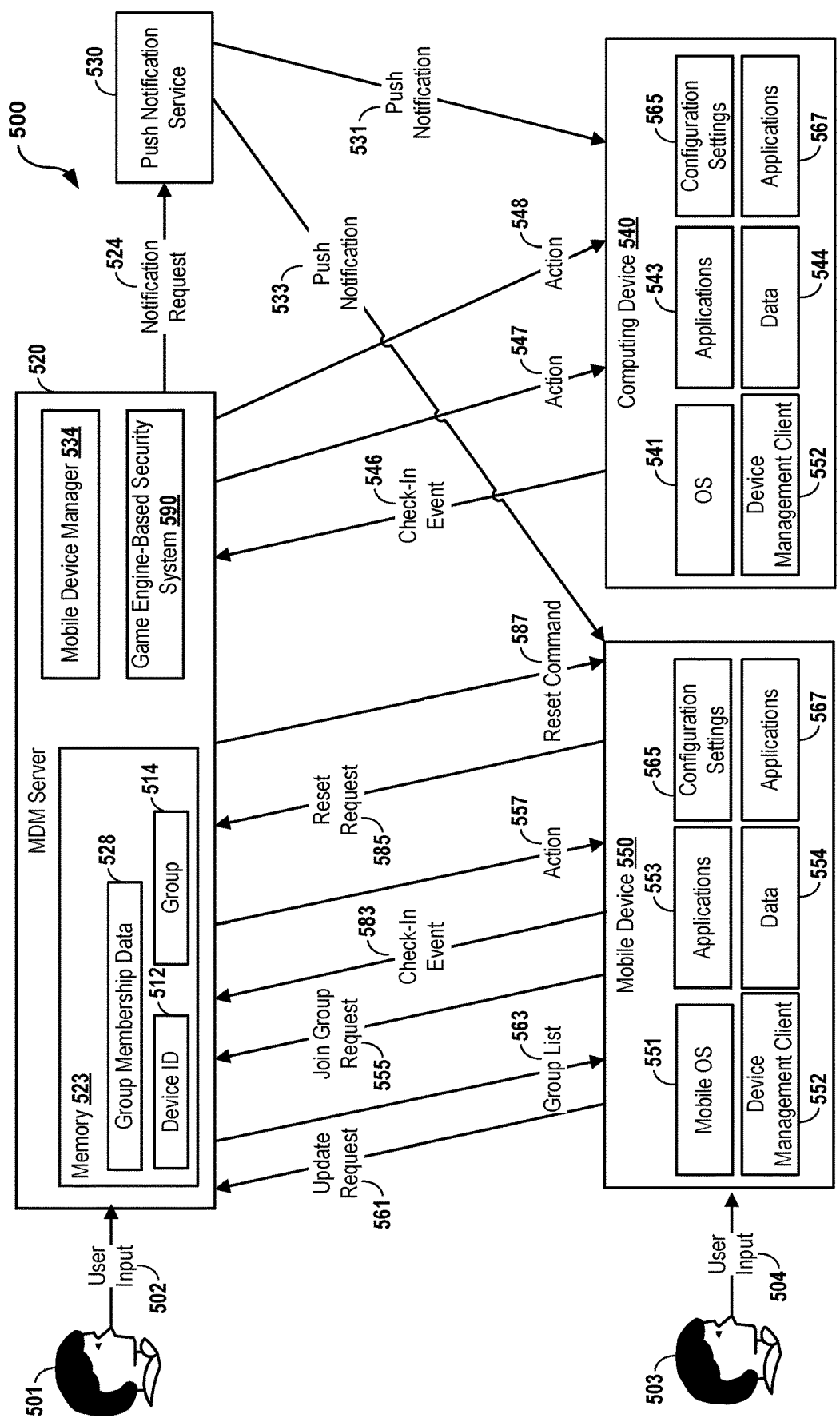
FIG. 5 illustrates an example of a mobile device management (MDM) system including game engine-based computer security.

FIG. 5 illustrates an example of a system operable to perform mobile device management, and is generally designated 500. The system 500 includes an MDM server 520. The MDM server 520 is coupled to a push notification service 530, to a mobile device 550, and to a computing device 540. It should be understood that the MDM server 520 coupled to two devices is provided as an illustrative example. In some aspects, the MDM server 520 is coupled to fewer than two devices or more than two devices.

The computing device 540 may include an operating system (OS) 541 and the mobile device 550 may include a mobile OS 551. Each OS 541, 551 may control computing functions, such as input/output (e.g., a touchscreen display, speaker, microphone, camera, etc.) and networking (e.g., cellular, Bluetooth, wireless fidelity (Wi-Fi), Ethernet, etc.). Each OS 541, 551 may also support execution of applications (apps) 543, 553, 567 and provide such applications access to device resources and data 544, 554. Examples of applications include, but are not limited to, a web browser, email, a calendar, social networking, a document/eBook reader, a media player, a gaming application, a patient management application, a medical reference application, a medication tracking tool, etc. Applications may correspond to software instructions that are stored in a memory and executed by a processor, hardware circuits that implement application functionality, or both.

The mobile device 550 includes a device management client 552. In some examples, the device management client 552 is configured to, in response to receiving input (e.g., user input 504 from a user 503) indicating that the mobile device 550 is (or is to be) part of a group 514, send a join group request 555 to the MDM server 520. The device management client 552 is configured to receive a command to perform an action 557 from the MDM server 520 and to initiate performance of the action 557. The action 557 includes, for example, downloading the one or more applications 567 associated with the group 514, downloading one or more configuration settings 565, etc. In some implementations, sending the join group request 555 indicating the group 514 does not cause deletion, at the mobile device 550, of applications, data, or a combination thereof, associated with any groups different from the group 514. In other implementations, sending the join group request 555 indicating the group 514 initiates deletion, at the mobile device 550, of applications, data, or a combination thereof, associated with one or more groups different from the group 514. For example, the join group request 555 initiates deletion of applications and data associated with groups other than the group 514, whereas a reset request 585 initiates deletion of all applications, all data, the mobile OS 551, the device management client 552, or a combination thereof.

The computing device 540 also includes a copy of the device management client 552. The device management client 552 of the computing device 540 is configured to, in response to receiving a push notification 531 from the push notification service 530, initiate performance of a check-in event 546 by sending a check-in request to the MDM server 520.

In a particular aspect, the device management client 552 corresponds to a processor configured to perform one or more operations described herein. In a particular aspect, the device management client 552 corresponds to instructions that, when executed by a processor, cause the processor to perform one or more operations described herein. In a particular aspect, the device management client 552 corresponds to a computer-readable storage device that stores instructions that are executable to perform one or more operations described herein.

The MDM server 520 includes a memory 523, a mobile device manager 534, or both. The memory 523 is configured to store group membership data 528 and device identifiers 512 of managed devices. The group membership data 528 indicates actions to be performed for particular groups, devices included in a group, or a combination thereof. For example, the mobile device manager 534 is configured to, in response to receiving the join group request 555 from the mobile device 550 and determining that the join group request 555 indicates the group 514, update the group membership data 528 to add the mobile device 550 to the group 514. The mobile device manager 534 is configured to send a command to the mobile device 550 indicating that the action 557 is to be performed.

In a particular aspect, the mobile device manager 534 corresponds to a processor configured to perform one or more operations described herein. In a particular aspect, the mobile device manager 534 corresponds to instructions that, when executed by a processor, cause the processor to perform one or more operations described herein. In a particular aspect, the mobile device manager 534 corresponds to a computer-readable storage device that stores instructions that are executable to perform one or more operations described herein.

During operation, a user 501 (e.g., an IT administrator) sets up one or more groups at the MDM server. For example, the user 501 provides user input 502 to the MDM server 520 indicating the group 514, one or more additional groups, or a combination thereof. The user input 502 indicates names of the groups, actions corresponding to the groups, or a combination thereof. For example, the user input 502 indicates a group name (e.g., "Nursing") of the group 514. In an illustrative example, the group 514 is based on an employment role (e.g., nurse, lab technician, doctor, or manager). The user 501 can set up the group 514 based on any criteria. For example, the user 501 may set up the group 514 based on age, gender, employment role, location, skill, relationship, other criteria, or a combination thereof. The user input 502 indicates the action 557 to be performed upon a device joining the group 514. For example, the user input 502 indicates that members of the group 514 are authorized to access the applications 567, that members of the group 514 are not authorized to access (e.g., are restricted from accessing) the applications 553, or a combination thereof. In a particular aspect, the user input 502 indicates the configuration settings 565. The action 557 indicates downloading of the applications 567, downloading of the configuration settings 565, generating a GUI that includes icons of the applications 567, generating a GUI that excludes icons of applications 553 associated with a different group (e.g., "Doctors"), deleting (or uninstalling) the applications 553, or a combination thereof.

In various aspects, the user input 502 may indicate actions to be performed by devices when a new member is added to the group 514 or when a member leaves a group. The group membership data 528 may be updated wen a device joins or leaves a group. Devices may generally be grouped based on any criteria. Examples of grouping criteria include, but are not limited to, a device capability, a device component, a device status, a device battery level, a device memory space, a device operating system, a device software version, a device type, a device location, etc. In some examples, a group list 563 is maintained by the MDM server 520 and communicated to other devices in the system 500, for example in response to an update request 561. In another example, push notifications 531, 533 are initiated via a notification request 524 and are used to cause devices to initiate check-in events 583, 546 with the MDM server 520, which may communicate an updated group list 563 to devices in response to the check-ins. Other commands may also be communicated to devices when they check in. For example, the MDM server 520 may send actions 547, 548 that cause devices to download/install/uninstall applications or files, implement configuration settings, set an activation lock, modify smart group membership, etc. In some cases, a reset command 587 can be used to trigger factory reset at a device. In some cases, the reset command 587 may be sent in response to a reset request 585.

Whereas some of the foregoing use cases are described for computer security at a single device, the system 500 of FIG. 5 may enable game engine-based computer security based on sensor input and/or actions corresponding to multiple devices. For example, the MDM server 520 may include one or more components of a game engine-based security system, and such component(s) are designated at 590. To illustrate, the MDM server 520 may include one or more of the sensors 205, the system state model 210, the logic controller 215, the logic blocks 216, and/or the actuators 220. In a particular example, the MDM server 520 includes actuators and is configured to initiate actions with respect to one or more managed devices. In some examples, sensors and logic controllers/blocks may be located remote to the MDM server 520, such as at managed devices or other servers. In an alternative implementation, the MDM server 520 includes at least some of the logic controllers/blocks of the game engine.

The game engine-based security system may receive sensor input from multiple devices in the system 500, such as the computing device 540 and the mobile device 550. Logical rules may be defined to evaluate predicates based on data corresponding to multiple devices, which may or may not be in the same smart group. System state considered during rule evaluation may include state information associated with multiple managed devices. Security response actions may be taken on multiple devices, which may or may not be in the same group. Thus, in some cases, multiple managed devices may be sent a command to take an action based on a monitored event occurring at less than all (or perhaps none) of those managed devices. Similarly, events from multiple managed devices may be aggregated to identify a security threat (e.g., a distributed denial of service (DDoS) attack or botnet activity) that may be difficult to identify using events occurring at a single device.

As an illustrative non-limiting example, if a ransomware-like threat is detected on one device, other devices in the system that are not currently in use may be switched to a secondary network that is isolated from the infected device. In another illustrative non-limiting example, if multiple devices in a "Florida" smart group have almost no idle computing cycles, cryptomining malware may be detected, indicating that devices distributed to employees of a Florida branch of a company have been infected, likely through a localized infection vector.

In some examples, the predicate rules of the game engine-based security system are not hardcoded, and are instead dynamically adjustable at runtime. Sets of rules may be combined into security "profiles," and such profiles may be switched/adjusted dynamically based on operation at the game engine-based security system. To illustrate, an actuator may take an action to adjust the security profile in use at one or more devices so that overall rule evaluation is more or less aggressive. As an example, if potentially suspicious activity is identified at a managed device, other managed devices that are in the area or on the same network may be switched to a more aggressive (e.g., stricter) security profile and may increase verbosity of logged events and alerts. As another example, rules may be dynamically included/excluded from the rule evaluation pipeline responsive to an action taken by an actuator. As yet another example, a parameter of a rule (e.g., a threshold against which event data is compared) may be dynamically adjusted based on responsive to an action taken by an actuator. To illustrate, when confidence values are in use and a security threat is detected, the threshold at which an aggregate confidence is determined to correspond to suspicious activity may be reduced.

Rules/profiles may also be adjusted dynamically based on certain detected events. For example, more or less aggressive profiles may be used based on GPS location data or network data indicating that a device is connected to home network, an office network, an unknown network, an open/unsecured/public network, etc. It is to be understood that the foregoing examples regarding dynamic adjustment of rules/profiles can be implemented within the MDM context (e.g., as described with reference to FIG. 5) and also without involvement of MDM principles (e.g., as described with reference to FIGS. 2-4).

The system 500 of FIG. 5 may thus enable game engine-based computer security for managed computing devices, including detecting security threats based on sensor input from multiple devices and performing responsive actions on multiple devices.

Although one or more of FIGS. 1-5 may illustrate systems, devices, and/or methods according to the teachings of the disclosure, the disclosure is not limited to these illustrated systems, devices, and/or methods. Aspects of the disclosure may be suitably employed in any device that includes integrated circuitry including memory, a processor, and on-chip circuitry.

One or more functions or components of any of FIGS. 1-5 as illustrated or described herein may be combined with one or more other portions of another of FIGS. 1-5. Accordingly, no single aspect described herein should be construed as limiting and aspects of the disclosure may be suitably combined without departing form the teachings of the disclosure.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium (e.g., a computer-readable storage device) is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. A storage device is not a signal.

In an aspect, a computer-implemented security method is disclosed that includes configuring one or more game engine sensors to detect one or more events, the one or more game engine sensors communicatively coupled to a game engine. The method also includes configuring the game engine to: maintain one or more states representing a security situation; receive the one or more events detected by the one or more game engine sensors; update the one or more states based on the one or more events detected by the one or more game engine sensors; and initiate an action once a defined state is reached. In some aspects, the events are operating-system-level events. In some aspects, the operating-system-level events include one or more of: file system events, process events, network events, authentication events, authorization events, download events, screenshot events, removable media events, synthetic input events, volume events, user activity events, webcam events, or microphone events. In some aspects, the states are represented by association with one or more tags. In further aspects, at least one of the defined states require a plurality of tags.

In another aspect, a method includes receiving, at a game engine sensor of a computing device executing an operating system, first data from the operating system that represents occurrence of a monitored event. The method also includes sending, from the game engine sensor, second data corresponding to the monitored event to a game engine logic controller. The method further includes determining, at a first logic block of the game engine logic controller based on the second data and third data representing a system state of the computing device, that a first predicate condition is satisfied. The method includes determining, at a second logic block of the game engine logic controller based on the second data and the third data, that a second predicate condition is satisfied. The method also includes detecting a computer security threat based on the first and second predicate conditions being satisfied. The method further includes, based on detecting the computer security threat, instructing at least one game engine actuator to perform at least one action responsive to the computer security threat.

In another aspect, a system includes at least one processor and a memory storing instructions executable by the at least one processor to receive, at a game engine sensor, first data from an operating system that represents occurrence of a monitored event. The instructions are also executable to send, from the game engine sensor, second data corresponding to the monitored event to a game engine logic controller. The instructions are further executable to determine, at a first logic block of the game engine logic controller based on the second data and third data representing a system state associated with the computing device, that a first predicate condition is satisfied. The instructions are executable to determine, at a second logic block of the game engine logic controller based on the second data and the third data, that a second predicate condition is satisfied. The instructions are also executable to detect a computer security threat based on the first and second predicate conditions being satisfied. The instructions are further executable to, based on the detection of the computer security threat, instruct at least one game engine actuator to perform at least one action responsive to the computer security threat.

In another aspect, a computer-readable storage device stores instructions that, when executed, cause at least one processor to perform operations including receiving, at a game engine sensor, first data from an operating system that represents occurrence of a monitored event. The operations also include sending, from the game engine sensor, second data corresponding to the monitored event to a game engine logic controller. The operations further include determining, at a first logic block of the game engine logic controller based on the second data and third data representing a system state associated with the computing device, that a first predicate condition is satisfied. The operations include determining, at a second logic block of the game engine logic controller based on the second data and the third data, that a second predicate condition is satisfied. The operations also include detecting a computer security threat based on the first and second predicate conditions being satisfied. The operations further include, based on the detection of the computer security threat, instructing at least one game engine actuator to perform at least one action responsive to the computer security threat.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method of game engine-based computer security, the method comprising:

receiving, at a game engine sensor of a computing device executing an operating system, first data from the operating system that represents occurrence of a monitored event;

sending, from the game engine sensor, second data corresponding to the monitored event to a game engine logic controller, wherein the second data includes tag data associated with the monitored event;

determining, at a first logic block of the game engine logic controller based on the second data and third data representing a system state associated with the computing device, that a first predicate condition is satisfied;

determining, at a second logic block of the game engine logic controller based on the second data and the third data, that a second predicate condition is satisfied based at least in part on a determination that the tag data includes a first tag added to the tag data by the first logic block;

detecting a computer security threat based on the first and second predicate conditions being satisfied; and based on detecting the computer security threat, instructing at least one game engine actuator to perform at least one action responsive to the computer security threat.

2. The method of claim 1, wherein the game engine sensor comprises a file system monitor, a process monitor, an authentication monitor, a download monitor, a screenshot monitor, a removable media monitor, a synthetic click monitor, a volume monitor, a user activity resumption monitor, a camera monitor, a microphone monitor, or any combination thereof.

3. The method of claim 1, wherein the second data includes a type of the monitored event, a path of the monitored event, directory information associated with the monitored event, app information associated with the monitored event, or any combination thereof.

4. The method of claim 1, wherein the second data includes information regarding a file associated with the monitored event, whether the file is modified, information regarding content of the file, or any combination thereof.

5. The method of claim 1, wherein the second data includes information regarding an executing process associated with the monitored event.

6. The method of claim 1, wherein the at least one action comprises updating the system state.

7. The method of claim 1, wherein the at least one action comprises generating an alert.

8. The method of claim 1, wherein the at least one action comprises quarantining a file, deleting a file, gathering additional data regarding the monitored event, terminating a process, adjusting a firewall, terminating a network connection, or any combination thereof.

9. The method of claim 1, wherein the game engine logic controller is executed by a mobile device management (MDM) server, and wherein the monitored event occurs at a first managed computing device remote from the MDM server.

10. The method of claim 9, wherein a second monitored event occurs at a second managed computing device, and wherein the computer security threat is detected further based on the occurrence of the second monitored event.

11. The method of claim 9, wherein the system state comprises state information associated with a plurality of managed computing devices.

12. The method of claim 1, wherein the at least one action comprises initiating sending of a command to a plurality of managed computing devices.

13. The method of claim 1, further comprising querying the system state based on at least a portion of the second data.

14. A system comprising:
at least one processor; and
a memory storing instructions executable by the at least one processor to:
receive, at a game engine sensor, first data from an operating system that represents occurrence of a monitored event;

send, from the game engine sensor, second data corresponding to the monitored event to a game engine logic controller, wherein the second data includes tag data associated with the monitored event;

determine, at a first logic block of the game engine logic controller based on the second data and third data representing a system state associated with a computing device, that a first predicate condition is satisfied;

determine, at a second logic block of the game engine logic controller based on the second data and the third data, that a second predicate condition is satisfied based at least in part on a determination that the tag data includes a first tag added to the tag data by the first logic block;

detect a computer security threat based on the first and second predicate conditions being satisfied; and based on the detection of the computer security threat, instruct at least one game engine actuator to perform at least one action responsive to the computer security threat.

15. The system of claim 14, further comprising a mobile device management (MDM) server that includes the at least one processor and the memory.

16. The system of claim 15, wherein the monitored event occurs at a first managed computing device remote from the MDM server, and wherein the at least one action comprises initiating sending of a command to a second managed computing device that is distinct from the first managed computing device.

17. A computer-readable storage device storing instructions that, when executed, cause at least one processor to perform operations comprising:
receiving, at a game engine sensor, first data from an operating system that represents occurrence of a monitored event;

sending, from the game engine sensor, second data corresponding to the monitored event to a game engine logic controller, wherein the second data includes tag data associated with the monitored event;

determining, at a first logic block of the game engine logic controller based on the second data and third data representing a system state associated with a computing device, that a first predicate condition is satisfied;

determining, at a second logic block of the game engine logic controller based on the second data and the third data, that a second predicate condition is satisfied based at least in part on a determination that the tag data includes a first tag added to the tag data by the first logic block;

detecting a computer security threat based on the first and second predicate conditions being satisfied; and based on the detection of the computer security threat, instructing at least one game engine actuator to perform at least one action responsive to the computer security threat.

18. A method of game engine-based computer security, the method comprising:
receiving, at a game engine sensor of a first managed computing device executing an operating system, first data from the operating system that represents occurrence of a first monitored event occurring at the first managed computing device;

sending, from the game engine sensor, second data corresponding to the first monitored event to a game engine logic controller executed by a mobile device management (MDM) server remote from the first managed computing device;

determining, at a first logic block of the game engine logic controller based on the second data and third data representing a system state associated with the first managed computing device, that a first predicate condition is satisfied;

determining, at a second logic block of the game engine logic controller based on the second data and the third data, that a second predicate condition is satisfied;

detecting a computer security threat based on the first and second predicate conditions being satisfied, and based on a second monitored event occurring at a second managed computing device; and based on detecting the computer security threat, instructing at least one game engine actuator to perform at least one action responsive to the computer security threat.

\* \* \* \* \*